United States Patent [19]

Koshimizu

[11] 4,270,354
[45] Jun. 2, 1981

[54] MASTER CYLINDER

[75] Inventor: Naganori Koshimizu, Yokohama, Japan

[73] Assignee: Tokico Ltd., Kanagawa, Japan

[21] Appl. No.: 934,592

[22] Filed: Aug. 17, 1978

[30] Foreign Application Priority Data

Aug. 19, 1977 [JP] Japan .............................. 52/99353

[51] Int. Cl.$^3$ .............................................. F15B 7/00
[52] U.S. Cl. ...................................................... 60/581
[58] Field of Search ................................ 60/562, 581

[56] References Cited

U.S. PATENT DOCUMENTS

| | | | |
|---|---|---|---|
| 3,415,060 | 12/1968 | Belart | 60/581 |
| 3,486,337 | 12/1969 | Tenniswood | 60/581 |
| 3,488,959 | 1/1970 | Tenniswood | 60/562 |
| 3,922,858 | 12/1975 | Sadler | 60/581 |
| 4,004,425 | 1/1977 | Pickering | 60/562 |
| 4,074,532 | 2/1978 | Hayashida | 60/581 |

*Primary Examiner*—Abraham Hershkovitz
*Attorney, Agent, or Firm*—Wenderoth, Lind & Ponack

[57] ABSTRACT

A master cylinder has a piston assembly, which includes two different diameter pistons, coaxially received in the cylinder body for slidable movement therein with the piston having reduced diameter portions at the opposing ends. A connection means, which includes a split sleeve and a cylindrical sleeve member retainer thereabout connects the two pistons by means of convex shaped portions which are located on the split sleeve which engage the reduced diameter portions of the pistons. A spring is provided between the piston assembly and connection means to normally urge the piston assembly to its return position.

4 Claims, 3 Drawing Figures

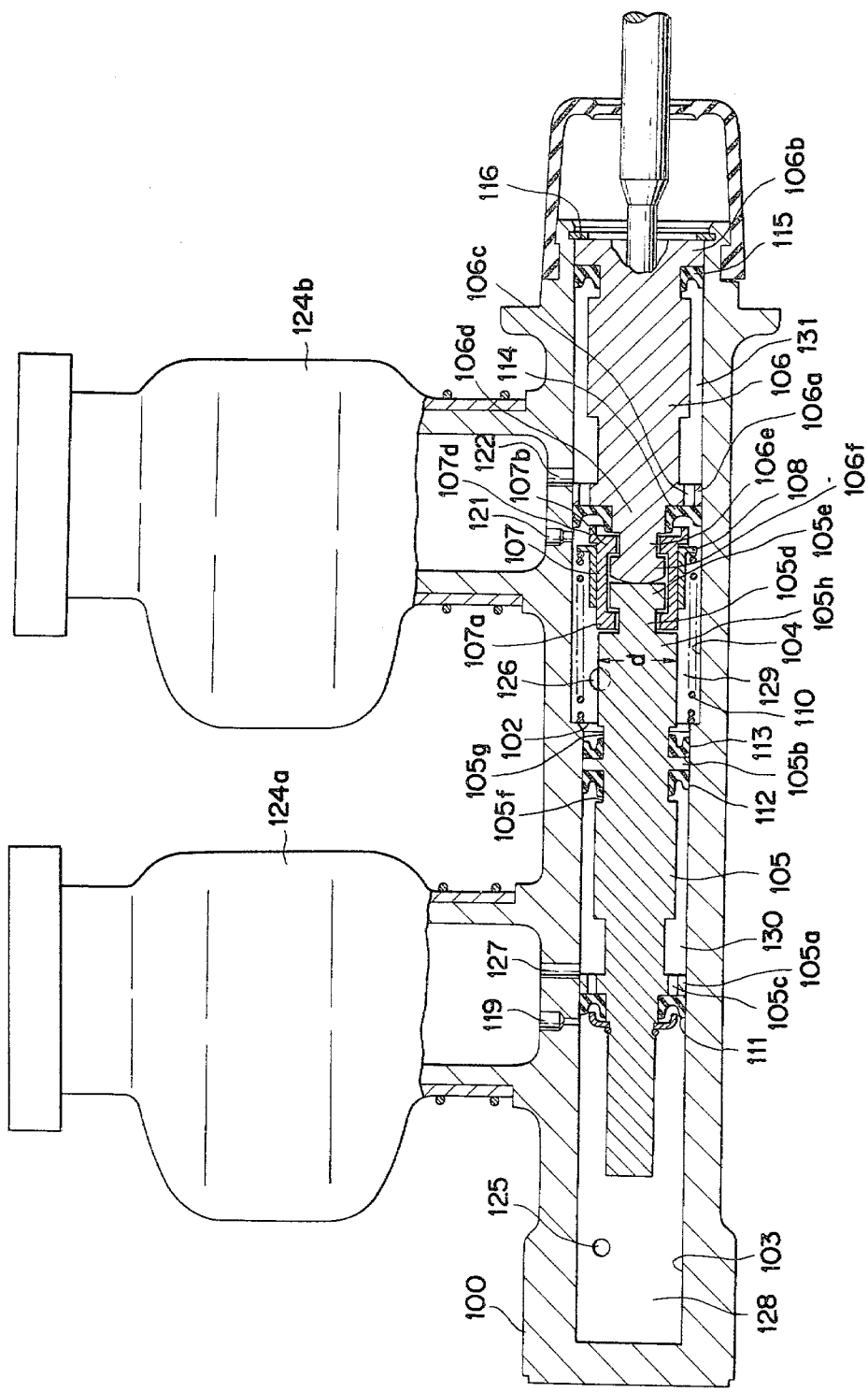

MASTER CYLINDER

BACKGROUND OF THE INVENTION

This invention relates to a master cylinder and more particularly, to a tandem-type master cylinder. There have been proposed and practically employed a variety of tandem-type master cylinders in the prior art. One of the prior art tandem-type master cylinders has an equalizing cylinder movably provided between the pressure generation chambers associated with the two pistons, respectively, in order to equalize pressure generated by the leading piston and following piston which are coaxially disposed within the main cylinder for slidable movement. This results in the pressure within the pressure chambers being adjusted to equalize the pressures. However, since the equalizing cylinder is designed to move back and forth within the main cylinder and since the movement of the equalizing cylinder is vibratory, prompt and precise, movement of the equalizing cylinder can not be expected. Since the equalizing cylinder moves in the two opposite directions or back and forth, the equalizing cylinder has to be maintained in its neutral position prior to the operation of the master cylinder and thus, for this purpose, the number of parts required for the device is inevitably increased which in turn increases the size of the device resulting in increase in the size of the entire master cylinder.

In order to eliminate the disadvantages inherent in the prior art master cylinder described above, the applicant herein describes a master cylinder such as disclosed in Japanese Patent Application No. 106061/1966. In the master cylinder as disclosed in this Japanese Patent application, prompt and precise operation of the equalizing cylinder is ensured and further, the number of parts of the equalizing cylinder is reduced, resulting in the reduction of the entire size of the master cylinder. However, in the master cylinder of the above noted patent application, as in the case of other tandem-type master cylinders known prior to this patent application, when the piston assembly comprising the smaller and larger diameter pistons is inserted into the main cylinder of the master cylinder, a sleeve and a spring are first inserted into the cylinder and the piston assembly is then inserted into the cylinder against the force of the spring. Such an assembling procedure is very inefficient in both the operation for inserting the piston assembly into the sleeve and cylinder or the assembling of the complete master cylinder because there is play present in the connection between the smaller and larger diameter positions.

Furthermore, in the master cylinder of the type as disclosed in the above noted patent application, in order to connect the larger and smaller diameter pistons together, it is necessary to employ a cylindrical split sleeve, a cylindrical retainer disposed about the split sleeve to protect the sleeve and a clip for preventing the retainer from coming off the sleeve in the axial direction. Thus, it is necessary to assemble the clip onto the sleeve and retainer assembly after the retainer has been disposed about the split sleeve in order to prevent the retainer from coming off the sleeve in the axial direction. This requirement increases the time and cost required to assemble the device.

SUMMARY OF THE INVENTION

Therefore, the principal object of the present invention is to facilitate insertion of the piston assembly into the cylinder.

Another object of the present invention is to efficiently insert the piston assembly into the cylinder by providing a sleeve member retainer having an integral spring abutment and normally urging the retainer in one direction with the spring to prevent the retainer from coming off the sleeve in the axial direction and without requiring clip parts and thereby eliminating the assembling operation of the clip parts.

The above and other objects, features and resulting advantages of the present invention will be more readily apparent to those skilled in the art from a reading of the following detailed description with reference to the accompanying drawings which show preferred embodiments of the invention for illustration purposes only, and not limiting the scope of the invention in any way.

BRIEF DESCRIPTION OF THE DRAWINGS

FIG. 2 is a longitudinally sectional view of a second embodiment of the master cylinder constructed in accordance with the present invention.

DETAILED DESCRIPTION OF THE PREFERRED EMBODIMENTS

The present invention will now be described referring to the accompanying drawings in which preferred embodiments of the master cylinder of the invention are shown.

Figure 1:
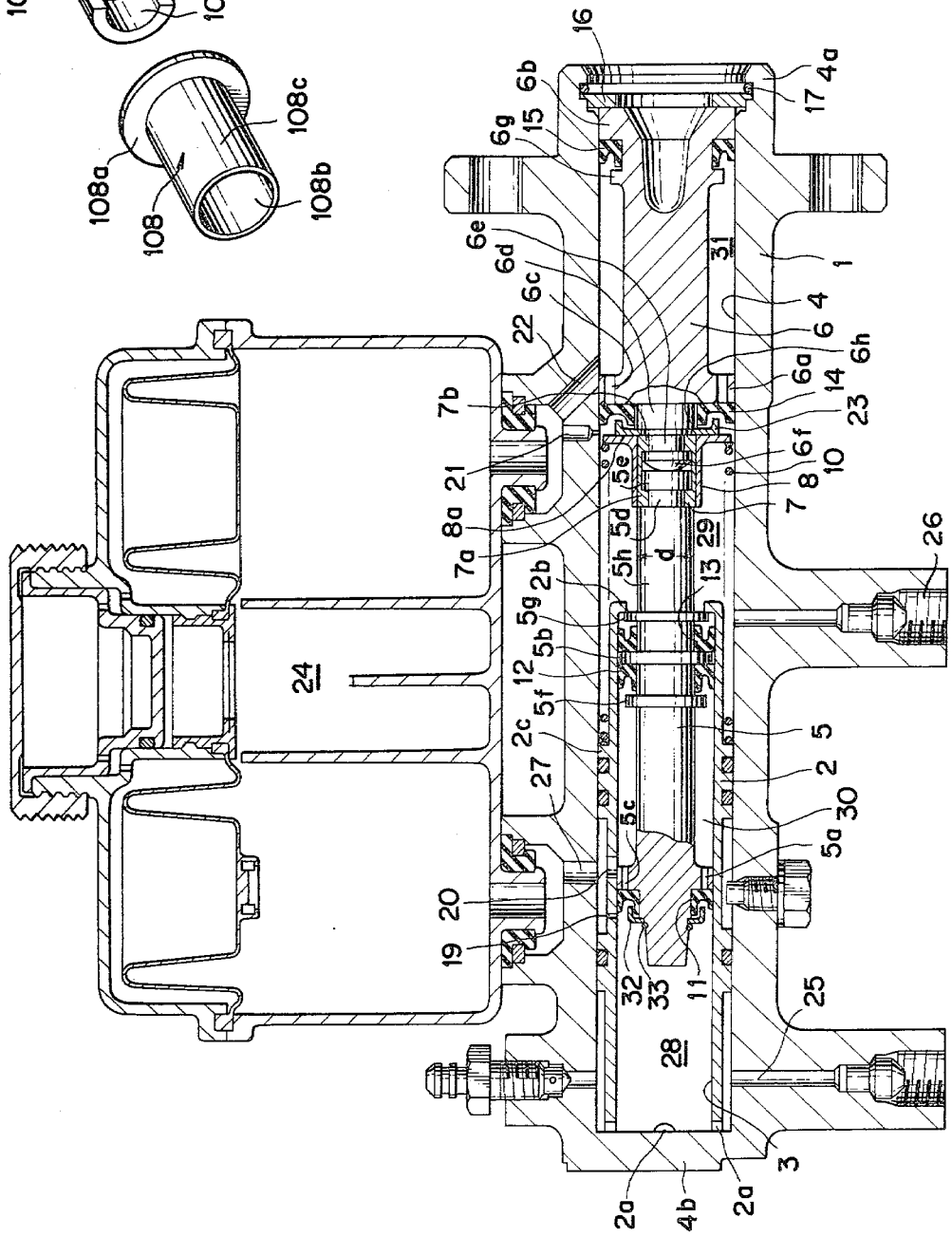
FIG. 1 is a longitudinally sectional view of a first embodiment of the master cylinder constructed in accordance with the present invention.

The master cylinder includes a cylinder body 1 which has a cylinder 4 therein. The cylinder body 1 has an oil reservoir 24 which is filed with oil which is supplied from the reservoir, through supply ports 22 and 27 located in the wall of the main body 1, to the cylinder 4 for filling the cylinder 4 with the oil. One end 4a of the cylinder is open and the other end 4b of the cylinder is closed. There is a sleeve 2 which is slidably received in the cylinder 4 and which has a plurality of laterally spaced flanges on the outer periphery thereof with the flanges resulting in fluid-tight seals to the sleeve 2 in cooperation with conventional sealing means. The left-hand end of the sleeve 2 (as seen in FIG. 1) has a plurality of notches 2a which allow communication between the exterior and interior of the sleeve 2 even when the left-hand end of the sleeve 2 abuts against the closed end 4b of the cylinder 4. The right-hand end of the sleeve 2 has an inwardly projecting flange 2b integral therewith which is formed by bending the right-hand end of the sleeve radially and inwardly. As will be described hereinafter, the annular projection 2b cooperates with a piston 5 which is slidably received in a smaller diameter cylinder 3 which is defined by the sleeve 2.

The smaller diameter piston 5 has a left-hand flange 5a which is adjacent the left-hand end, a smallest diameter neck portion 5d which is adjacent the right-hand end, a head portion 5a having a flat outer end face and a diameter which is greater than the neck portion 5d at the extreme right-hand end, a largest diameter intermediate flange 5b in the intermediate portion between the opposite ends and auxiliary flanges 5f and and 5b which are spaced from the opposite sides of the intermediate flange 5b and which have a diameter which is smaller than the flange 5b but larger than the head portion 5e. The axial length 5h of the portion of the piston 5 extending between the auxiliary intermediate flange 5g and the smallest diameter neck portion 5d is substantially greater than the axial length of a retainer 8, the description of which will be made hereinafter. The diameter of the head portion 5e is smaller than the diameter d of the sleeve portion 5h and the diameter of the auxiliary flanges 5f and 5g is smaller than that of the intermediate flange 5b. However, the outer diameter of at least the auxiliary flange 5g is greater than the inner diameter of the annular projection 2b. The left-hand end flange 5a has a number of ports 5c which extend through the flange. In order to maintain the piston 5 in fluid-tight relationship to the sleeve 2, cup seals 11, 12 and 13 are provided on the left-hand face of the flange 5a and on the opposite faces of the intermediate flange 5b, respectively, between the inner surface of the cylinder 3 and the peripheries of these flanges. The cup seal 11 is held in position by means of a stop ring 32 and a clip 33 which is disposed about the piston 5 at the left-hand face of the flange 5a both of which are conventional. Cup seals 11, 12 and 13 operate as one-way valves to prevent oil from flowing from a first pressure chamber 28 which is defined by the smaller diameter piston 5, the closed end 4b of the cylinder 4 and the inner surface of the sleeve 2 toward and into a first supply chamber 30 which is defined by the flanges 5a and 5b on the smaller diameter piston 5. The seals prevent the oil from flowing through the ports 5c in the flange 5a, but allow the oil to flow from the first supply chamber 30 toward and into the first pressure chamber 28. The cup seals 12 and 13 are interposed between the intermediate flange 5b and auxiliary flange 5f and between the flange 5b and auxiliary flange 5g, respectively.

A larger diameter piston 6 is provided on the right-hand side of the smaller diameter piston 5 for slidable movement within the cylinder 4. The piston 6 has a flange 6a at the right-hand end and a similar flange 6b adjacent to the left-hand end, respectively. The flange 6a has a number of ports 6c which are similar to the ports 5c which are located in the flange 5a on the smaller diameter piston 5. The larger diameter piston 6 further has a reduced diameter portion 6d on the left-hand side of the flange 6a, a further reduced diameter neck portion 6e on the left-hand side of the portion 6d and a head portion 6f which has the diameter smaller than that of the reduced diameter portion 6d but larger than that of the neck portion 6e. The reduced diameter neck portion 63 preferably has the same diameter as the corresponding reduced diameter neck portion 5d on the smaller diameter piston 5 and similarly, the head portion 6f preferably has the same diameter as the corresponding head portion 5e on the smaller diameter piston 5. The head portion 6f includes a substantially spherical end face which is adapted to contact the opposing flat end fae of the neck portion 5e. The flanges 6a and 6b cooperate with other means, such as a stop ring 23 which is disposed on the piston 6 inwardly of the neck portion 6e and the flange 6g, to hold cup seals 14 and 15 in position, respectively. The stop ring 23 has a bore which has the inner diameter smaller than the diameter of the reduced diameter neck portion 6d but larger than the outer diameter of the head portion 6f. The stop ring 23 is positively supported by a shoulder 6h on the left-hand end face of the reduced diameter portion 6d. As described, the cup seal 14 operates as a one-way valve in the same way as the cup seal 11 does.

The smaller diameter piston 5 and the larger diameter portion 6 are connected together by means of a connecting means which includes a split sleeve 7 which preferably has a cylindrical configuration of the same outer diameter as that of the diameter d of the extended sleeve portion 5h and has annular projections 7a and 7b at the opposite ends of the inner periphery of the sleeve. The projections 7a and 7b are for being fitted on the reduced diameter neck portions 5d and 6e of the smaller and larger diameter pistons 5 and 6, respectively. The connecting means also include a cylindrical sleeve member retainer 8 which has a bore whose inner diameter is slightly greater than the diameter d of the extension 5h of the smaller diameter piston 5 and an enlarged diameter flange 8a at the right-hand end.

A spring 10 is interposed between the extreme right-hand flange 2c on the outer periphery of the sleeve 2 and the flange 8a of the sleeve member retainer 8 for urging the retainer 8 in one direction (rightwards as seen in FIG. 1). The retainer 8 is thus caused to abut against the stop ring 23 and be normally positioned on the outer periphery of the split sleeve 7. The spring 10 urges the sleeve 2 towards the closed end 4b of the cylinder 4 or leftwards. The spring 10 urges the piston assembly, which includes the smaller and larger diameter pistons 5 and 6, towards the open end 4a of the cylinder 4 or rightward through the flange 8a of the sleeve member retainer 8 and the stop ring 23, which bears against the right-hand face of the flange 8a, and the shoulder 6h and nection portion 6d of the larger diameter piston 6. A stop 16 is secured to the outer face of the open end 4a of the cylinder 4 by means of a retaining ring 17 fitted in the open end 4a of the cylinder 4 and the piston assembly 5 and 6 is normally urged against the stop 16.

The cylinder body 1 has two discharge openings, and more particularly, one of the discharge ports is a discharge opening 25 which communicates with the first pressure chamber 28 and the other is a discharge opening 26 which communicates with a second pressure chamber 29 which is defined by the smaller diameter piston 5, the larger diameter piston 6 and the innermost flange 2c on the sleeve 2.

The sleeve 2 has a supply port 20 which normally supplies oil from the reservoir 24 toward and into the first supply chamber 30 through the supply port 27. The sleeve 2 also has a relief port 19 which communicates between the reservoir 24 and the first pressure chamber 28 and is positioned slightly forwardly of the cup seal 11 in front of the supply.

The oil from the reservoir 24 flows into a second supply chamber 31 by means of the supply port 22 in the cylinder body 1. The supply chamber 31 is defined by the inner and outer end flanges 6a and 6b on the larger diameter piston 6 and the cylinder 4 in the cylinder body 1. The cylinder body 1 further has a relief port 21 through which the reservoir 24 is in communication with the second pressure chamber 29.

In the above-described construction and arrangement of the components of the master cylinder of the invention, when the piston assembly is moved leftwards against the force of the spring 10 through the operation of a pedal (not shown), the liquid or oil within the first pressure chamber 28 is discharged under pressure through the discharge opening 25 through the notches 2a. This is caused by the pressurization of the oil within the second pressure chamber 28 after the relief port 19 has been closed by the cup seal 11. Similarly, the liquid under pressure is discharged through the discharge opening 26 after the relief port 21 has been closed by the cup seal 14. The thus discharged pressurized liquids are then introduced into the brake systems which are connected to the discharge openings 25 and 26, respectively, to cause the brake systems to perform their predetermined operations.

In the first embodiment of the master cylinder of the invention as described hereinabove, when the smaller diameter piston 5 and the larger diameter piston 6 are to be initially assembled, the smaller diameter piston 5 is first inserted with the right-hand end leading through the left-hand end of the sleeve 2 into the interior of the sleeve until the auxiliary flange 5g on the piston 5 abuts against the annular projections 2b on the sleeve. The spring 10 is then slid along the outer periphery of the sleeve 2 from the right-hand end of the sleeve to be fitted thereon. Thereafter, the sleeve member retainer 8 is slid along the piston 5 from the right-hand end of the piston 5 to be fitted thereon so that the spring 10 is held in position between the flange 2c on the sleeve 2 and the flange 8a on the retainer 8. The sleeve member retainer 8 is then slid along the right-hand end portion of the smaller diameter piston 5 until the right-hand end of flange 8a of the retainer 8 is positioned leftwardly of the neck portion 5d of the smaller diameter piston 5. With the sleeve member retainer 8 held in this position, the head portion 6f of the larger diameter piston 6 is brought into contact with the head portion 5e of the smaller diameter piston 5 and the inwardly projecting portions 7a and 7b at the opposite ends on the inner surface of the split sleeve 7 are respectively fitted onto the reduced diameter neck portions 5d and 6e of the smaller and larger diameter pistons 5 and 6. The retainer 8 is slowly slid onto and along the split sleeve 7 toward the right from the left-hand end of the split sleeve 7 against the resilient force of the spring 10. When the sleeve members retainer 8 is fitted on the shoulder 6h of the larger diameter piston 6, prior to the fitting of the split sleeve 7 onto the reduced diameter neck portions 5d and 6e, the shoulder 6h is caused to abut against the stop 23 under the force of the sleeve member retainer 8. The sub-assembly including the piston assembly and sleeve is thus completed. Finally, the sub-assembly is inserted into the cylinder body 1. In the illustrated embodiment, the means for preventing the smaller diameter piston 5 from coming off the sleeve 2 under the force of the spring 10 can include an annular groove along the inner periphery of the sleeve 2 and a C-shaped clip can be placed in the annular groove. This structure would be used instead of the illustrated annular projection 2b. The type of retaining means is a matter of choice in designing the master cylinder of the invention.

Figure 3:
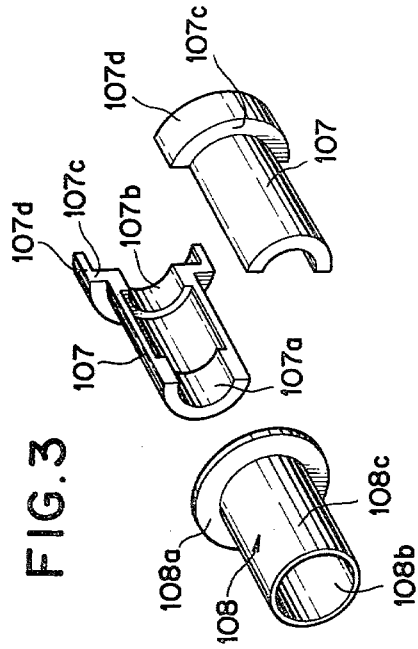
FIG. 3 is an exploded perspective view of the split sleeve and retainer of the master cylinder shown in FIG. 2.

Referring now to FIGS. 2 and 3 in which a second embodiment of the master cylinder of the invention is shown. The second embodiment is substantially similar to the first embodiment except that the sleeve defining the bore or smaller diameter cylinder in which the smaller diameter piston slides is eliminated. The cylinder body is made up of two integral coaxial cylinder portions having different diameters with a different means for regulating the direction in which the retainer is urged by the spring being provided.

In FIG. 2, the master cylinder 100 has coaxial smaller and larger diameter cylinder portions 103 and 104 and the smaller diameter cylinder portion 103 has a shoulder 102 at the inner end where the smaller diameter cylinder portion 103 is connected to the larger diameter cylinder portion 104. A smaller diameter piston 105 and a larger diameter piston 106 are respectively received in the smaller and larger diameter cylinder portions 103 and 104. Reference numerals 125 and 126 denote discharge openings and reference numerals 128 and 129 denote respective pressure chambers 128 and 129.

The smaller diameter piston 105 and larger diameter piston 106 are connected together at their opposing inner ends by means of a connection which includes a split sleeve 107 and a retainer 108. As in the case of the smaller diameter piston 105 in the first embodiment, the smaller diameter piston 105 in the second embodiment has a left-hand end flange 105a which has ports 105c, an intermediate flange 105b, a reduced diameter neck portion 105d and a head portion 105e, the diameter of which is smaller than the flange 105a but larger than the neck portion 105d, and cup seals 111, 112 and 113 which are disposed on the left-hand face of the flange 105a and on the opposite faces of the intermediate flange 105b, respectively. In the second embodiment, the auxiliary flanges for receiving the corresponding cup seal in the first embodiment are replaced by annular recesses 105f and 105g which are located on the outer periphery of the smaller diameter piston 105 and on the opposite sides of the intermediate flange 105b. An extension 105h having the diameter d is provided between the annular recess 105g and reduced diameter neck portion 105d. The length of the extension 105h is substantially greater than the axial length of the retainer 108. The diameter of the head portion 105e is smaller than the diameter d and the diameter of the reduced diameter neck portion 105d is smaller than that of the head portion 105e.

The second embodiment of the larger diameter piston 106 is slidably received in the larger diameter cylinder portion 104 and has flanges 106a and 106b at the left-hand and right-hand ends of the piston, respectively. The flange 106a has ports 106c. As in the case of the first embodiment, the larger diameter piston 105 further has a reduced diameter portion 106d on the left side of the reduced diameter portion 106d, a reduced diameter neck portion 106e on the left side of the reduced diameter portion 106d and a head portion 10f on the left side of the reduced diameter neck portion 106e. Cup seals 114 and 115 are respectively provided around the flanges 106a and 106b.

A split sleeve which is made up of two semi-circular cross-section half portions 107, 107 has radial projecting portions 107a and 107b at the opposite ends on the inner peripheral surface and includes a shoulder 107c which is integral therewith at the right-hand end and an enlarged diameter flanged portion 107d. The outer diameter of the portion 107d is preferably substantially equal to the diameter d of the first or smaller diameter piston 105. Although the sleeve 107 can be made up by three or four similar sector portions, the sleeve is preferably made up by two semi-circular cross-section members, as shown in FIG. 3, because such a two part construction is easy to assemble.

A cylindrical retainer 108 is fitted about the split sleeve 107 and as in the case of the corresponding part of the first embodiment, the retainer is made up of a main body portion 108c which has a bore 108b receiving the sleeve 107 therein, and an enlarged diameter flanged portion 108a which extends radially and outwardly at the right-hand end of the body portion 108c. The left-hand end face of the flanged portion 108a is engaged by one end of a spring 110, the other end of which abuts against the shoulder 102 of the cylinder body 100. The retainer 108 is urged rightwards by the resilient force of the spring 110. The right-hand end face of the retainer 108 contacts the enlarged diameter wall portion 107c of the split sleeve 107, which normally urges a piston assembly including the smaller and larger diameter pistons 105 and 106, against a stop 116 which is fitted on the cylinder portion 104 at the right-hand end thereof through the projecting portion 107b of the sleeve 107 and the reduced diameter neck portion 106e of the larger diameter piston 106.

The cylindrical portion 107d of the sleeve 107 operates to urge the cup seal 114 against the left-hand face of the flange 106a.

The cylinder body 110 has supply ports 127 and 129 and relief ports 121 and 122 which are in communication with oil tanks 124a and 124b, respectively and also communicate with oil supply chambers 130 and 131.

The operation of the second embodiment is substantially the same as that of the first embodiment.

In the second embodiment, the spring 110 which acts on the connection means, which includes the split sleeve 107 and retainer 108, directly abuts at one end against the shoulder 102 of the cylinder 100. The resilient force of the spring 110 is directly transmitted from the split spring 107 to the piston assembly and thus, the split sleeve 107 can be considered as having the stop 23 of the first embodiment integral therewith.

In the second embodiment, when the smaller and larger diameter pistons 105 and 106 are to be inserted into the cylinder body 100, the spring 110 is first inserted into the cylinder body 100. The projecting portions 107a and 107b of the split sleeve 107 are fitted into the reduced neck portions 105d and 106e of the smaller and larger diameter pistons 105 and 106, respectively with the head portions 105e and 106f of the two pistons 105 and 106 and in contact with each other. The piston assembly is slid into the cylinder body 100 against the force of the resilient force of the spring 110 with the retainer 108 being disposed about the split sleeve 107. In the present invention, in order to regulate the position of the retainer 8 or 108 against the biasing force of the spring 10 or 110, the sleeve member retainer 8 or 108 is caused to abut against the shoulder 6h of the larger diameter piston 6 or the shoulder 107c of the split sleeve 107. In the alternative, the outer diameter of the split sleeve 7 or 107 can be somewhat greater than the diameter d of the extension 5h or 105h of the smaller diameter piston 5 or 105 and an inwardly and radially projecting bend is formed in the end face of the sleeve member retainer 8 or 108 adjacent to the smaller diameter piston 5 or 105 so that the bend is engaged by a portion of the smaller diameter piston 5 or 105. Such an alternative is a matter of choice in designing the master cylinder.

As compared with the conventional prior art assembling procedures wherein the sleeve and spring are assembled with the cylinder and the piston assembly is then inserted into the cylinder against the force of the spring, since the smaller diameter piston of the present invention has been previously inserted into the sleeve, and the spring is thus held in position, it is only necessary to simply insert the sub-assemblies into the cylinder to thereby complete the assembling operation. No play is present in the connection between the larger and smaller diameter pistons and thus, no difficulty is encountered in the device. Thus, the assembling operation can be more rapidly performed.

Furthermore, the spring which is adapted to return the piston assembly to the inoperative position, directly acts on the retainer which holds the split sleeve, which connects the two pistons which make up the piston assembly so as to normally urge the retainer in one direction whereby the necessity of having clip parts for blocking the movement of the retainer in the opposite direction is eliminated. Therefore, since the number of parts of the piston assembly can be reduced, the assembling steps of the clip parts can be eliminated and the retainer can be prevented from coming off the sleeve through only the resilient force of the spring. Thus, the assembling operation of the retainer can be smoothly, promptly and precisely performed.

While only two embodiments of the invention have been shown and described in detail, it will be understood that the same are for illustration purpose only, and not intended to limit the scope of the invention in any way.

What is claimed is:

1. A master cylinder construction comprising a cylinder having two piston chambers of different diameters, the smaller diameter piston chamber of said different diameter piston chambers comprising a cylindrical sleeve slidably received in said cylinder, a first piston and a second piston slidably disposed respectively in the smaller diameter piston chamber and the larger diameter piston chamber of said piston chambers, reduced diameter stems projecting from the opposing end portions of the pistons, respectively, a flange formed around the outer periphery of each of said stems, a split sleeve consisting of at least two cooperating elements and having inwardly projecting portions on the inner circumferential surface thereof at the opposite ends respectively, said split sleeve being around said reduced diameter stems with the inwardly projecting portions engaging behind the respective flanges, a sleeve member around the outer circumference of the split sleeve portions for retaining the split sleeve portions in a cylindrical shape, said sleeve member having an annular outwardly extending flange at one end thereof, said one end of said sleeve member having transmitting means between said sleeve member and said second piston in the larger diameter piston chamber for transmitting a force to said second piston in the larger diameter piston chamber, a spring abutment projection located on the outer wall of said cylindrical sleeve which comprises the smaller diameter portion chamber of said piston chambers, said cylindrical sleeve further having an inwardly extending projection at the end adjacent said split sleeve for holding said first piston therein, a spring disposed around said sleeve member abutting against said annular outwardly extending flange and against said spring abutment projection for holding said cylindrical sleeve in said cylinder and said sleeve member on said split sleeve portions, and for causing said first and second pistons to return to a normal position after having been actuated.

2. A master cylinder construction as defined in claim 1 wherein said split sleeve members are two halves having a semi-circular cross-section.

3. A master cylinder construction as defined in claim 1 wherein said piston received in said smaller diameter piston chamber has a portion thereof adapted for receiving said sleeve member thereon during assembly of the master cylinder construction.

4. A master cylinder construction as defined in claim 1 further comprising a stop ring located at an open end of said cylinder on the outer end of said second larger diameter piston for holding both said pistons within said cylinder.

* * * * *